United States Patent [19]

Marti

[11] Patent Number: 5,065,852
[45] Date of Patent: Nov. 19, 1991

[54] MACHINE FOR AUTOMATICALLY POSITIONING AND FEEDING CONTAINERS

[76] Inventor: Jaime S. Marti, c/Emancipación 8, 08017-Barcelona, Spain

[21] Appl. No.: 623,558
[22] Filed: Dec. 7, 1990

[30] Foreign Application Priority Data

Dec. 8, 1989 [FR] France .............................. 89 16675
Jun. 1, 1990 [FR] France .............................. 90 07301

[51] Int. Cl.⁵ ........................................... B65G 29/00
[52] U.S. Cl. ................................. 198/392; 198/398; 198/400; 221/158; 221/159
[58] Field of Search .............. 198/392, 396, 397, 398, 198/400, 455; 221/158, 159, 162

[56] References Cited

U.S. PATENT DOCUMENTS

| | | | |
|---|---|---|---|
| 990,593 | 4/1911 | Ringland et al. | 221/235 |
| 1,823,995 | 9/1931 | Streby | 198/383 X |
| 1,989,924 | 2/1935 | Hill | 221/285 |
| 2,033,090 | 3/1936 | Barker | 221/160 X |
| 2,278,599 | 4/1942 | Veit | 209/544 |
| 2,343,496 | 3/1944 | Carroll | 221/233 X |
| 2,776,047 | 1/1957 | Howard | 198/464.4 |
| 2,777,561 | 1/1957 | Rose | 198/397 X |
| 2,901,088 | 8/1959 | Evasic | 198/397 |
| 2,904,162 | 9/1959 | Simer | 198/380 |
| 2,972,410 | 2/1961 | Schulte et al. | 209/644 |
| 3,012,651 | 12/1961 | Hawkes | 198/380 |
| 3,079,042 | 2/1963 | Sterling | 221/14 |
| 3,164,291 | 1/1965 | Sterling | 221/10 |
| 3,295,659 | 1/1967 | Aidlin | 221/169 X |
| 3,338,373 | 8/1967 | Aidlin et al. | 198/397 |
| 3,543,909 | 5/1968 | Ueda | 198/392 |
| 3,650,368 | 3/1972 | Nalbach | 198/397 |
| 3,656,604 | 4/1972 | Sterling | 198/392 |
| 3,662,872 | 5/1972 | Nalbach | 198/397 |
| 3,870,194 | 3/1975 | Taylor | 221/167 X |
| 4,130,194 | 12/1978 | Schindel et al. | 198/397 |
| 4,154,329 | 5/1979 | Hildenbrand | 198/392 |
| 4,388,989 | 6/1983 | Edmunds et al. | 198/346.2 |
| 4,463,846 | 8/1984 | Ionesu | 198/399 |
| 4,681,209 | 7/1987 | Marti | 198/382 |
| 4,798,277 | 1/1989 | Dubuit et al. | 198/397 |
| 4,825,995 | 5/1989 | Nalbach | 198/400 X |
| 4,865,181 | 9/1989 | Nalbach | 198/392 |
| 4,928,808 | 5/1990 | Marti | 198/397 |
| 4,949,834 | 8/1990 | Schindel | 198/397 X |
| 4,979,607 | 12/1990 | Fogg | 198/400 X |

FOREIGN PATENT DOCUMENTS

| | | | |
|---|---|---|---|
| 0166277 | 1/1986 | European Pat. Off. | |
| 0374107 | 6/1990 | European Pat. Off. | 198/400 |
| 459/10031 | 6/1966 | Fed. Rep. of Germany | |
| 2042547 | 8/1970 | Fed. Rep. of Germany | |
| 1236937 | 6/1960 | France | |
| 2307473 | 11/1979 | France | |
| 1558379 | 12/1979 | United Kingdom | 198/392 |

Primary Examiner—Robert P. Olszewski
Assistant Examiner—Cheryl L. Gastina
Attorney, Agent, or Firm—Fleit, Jacobson, Cohn, Price, Holman & Stern

[57] ABSTRACT

A machine for sorting and orienting containers including a main hopper (2) for receiving randomly a plurality of containers (1) or bottles to be sorted, having any convenient configuration and a bottom (4) with a peripheral edge portion at a predetermined distance from the side wall of the hopper (2) to provide a space through which the containers can drop, by gravity towards a lower section, a lateral aperture (32) in the side wall of the hopper in a curved lateral area (13) preceding the container unloading station (14), the aperture being adapted to remove mainly by centrifugal force malpositioned containers housed only partially in and protruding from holding and transporting units (6), or located external to them and conveyed by other containers, the aperture communicating with a recovering auxiliary hopper (15), external to the main hopper and a coupled belt type conveyor (16) associated with the external hopper for recycling containers into the loading area preceding the lateral aperture (32). As a supplement to the action of centrifugal force an air jet (33) may be located in the hopper in front of the lateral aperture (32) for impinging on bottles not correctly positioned to either correctly position the bottles in the recesses, or eject them. Alternatively, at least one rotating brush (18) may be provided whose bristles exert on malpositioned containers a force directed from inside to outside the hopper to assist in evacuation of containers out of the main hopper.

20 Claims, 7 Drawing Sheets

MACHINE FOR AUTOMATICALLY POSITIONING AND FEEDING CONTAINERS

BACKGROUND OF THE INVENTION

This invention relates to a machine intended for automatically positioning and continuously feeding containers, for example bottles or other hollow articles made from synthetic material, which may be of very different sizes and shapes, with the ability to change its rate of production by units of time within very wide margins. This machine is designed for continuous feeding of other machines such as high production filling machines or similar equipment and is able to carry out this function owing to the large number of containers which it can position correctly and feed per unit time.

Known machines of the type to which the present invention relates may include in general:

a) a hopper of any shape or dimension provided with an opening to receive in bulk containers that fall onto a bottom plane whose edges are at a distance from the side wall of the hopper providing a space allowing the passage of the containers;

b) a structure, provided with displacement means in enclosed circuit, located below the bottom plane, including, fully or in part:

a plurality of detachable container holding elements removable mounted at the periphery of the structure defining between their sides, the edge of the structure, and the hopper wall, a series of recesses adapted to receive containers in a lying position and provided with retaining means for one part of the containers, namely their neck, in such a way as to release them in a predetermined position, usually with the neck upward;

a plurality of discharge chutes provided under the recesses for receiving and transferring the containers, correctly oriented, towards an exit conveyor that feeds, for example, a bottling line;

c) a plane or shelf, which may be adjustable in height, located below the recesses and over the chutes, designed to support the containers when they are conveyed by the holding elements defining the recesses for receiving and retaining them in a lying position, the plane or shelf being provided with an opening in an unloading area through which the containers drop when moved into position thereover by the container holding elements;

d) a means, e.g. air nozzle means for directing air jets for ejecting incorrectly positioned containers from the recesses towards the loading area in the hopper, e.g. bottles seated in an incorrect manner and/or protruding from the recesses;

e) air nozzle means provided in the unloading area for directing air jets which help tilt the containers correctly positioned in the recesses, toward discharge chutes;

f) air nozzle means designed to eject out of the hopper containers not discharged in the unloading area, e.g. those that are faulty.

Machines known to the applicant are the following grouped by the function they perform:

a) Automatic Container Erection

Aidlin machine (U.S. Pat. No. 3,295,659) relates to a machine comprising a hopper into which the containers or bottles which are to be sorted are randomly loaded, having an inclined axis, an inclined disc constituting the bottom of the hopper and adapted to rotate about the inclined axis, a plurality of openings at the periphery of the disc each adapted to receive and pass one container while retaining the neck which is supported on the disc for transporting them from a receiving zone to an unloading zone, associated with a fixed plate beneath and parallel to the rotatable disc providing a support for the container bodies during their rotation and having a release opening in an upper part of the plate aligned with the path of movement of the containers as the disc rotates, so that the containers fall, by gravity, one by one in an upright position into a fixed chute or guideway located below the opening;

Nalbach machine (U.S. Pat. No. 3,650,368 and U.S. Pat. No. 4,865,181) includes an inclined rotating annular surface provided, with a row of receiving areas for the bottles seated in a lying position, delimited by attached holding elements provided with retaining means for the neck of the bottle, the annular surface providing for carriage of the bottles from a lower loading area to an upper unloading area, and associated with a lateral fixed plane that provides a support for the bottles during their rotation and has, at the upper part an opening to pass the bottles that fall, by gravity, in an upright position into a chute located below the opening.

b) Automatic Aligning Of The Containers

NALBACH machine mentioned above includes a plurality of chutes mounted on a revolving drum below the bottom of the receptacle or hopper and of the retainer fixed plane associated with an intermediate fixed plane located in the passage of the chutes and designed to prevent the bottles from directly falling onto the exit conveyor;

c) Accommodation Of The Machine To Different Container Shapes

Aidlin machine above adapts to different shapes and dimensions of the containers by changing the rotatable disc provided with openings by means of screws located in the area of its axis;

Schindel machine (U.S. Pat. No. 4,130,194) improves on Aidlin machine by only requiring changing the annular marginal part of the rotatable disc, provided with peripheral apertures to lodge the containers in a lying position, and evacuating the annular segments by the upper part of the receptacle;

Marti machine (U.S. Pat. No. 4,681,209) which describes a container positioning machine having a plurality of chutes mounted on a revolving drum below the bottom of the hopper integral with a rotatable disc assembly, the recesses for receiving the containers in a lying position on the disc assembly being formed by detachable parts which are interchangeable with replacement parts to accommodate different shapes and sizes of containers being handled wherein the chutes are also removable and exchangeable with chutes of different sizes.

Marti machine (U.S. Pat. No. 4,928,808) shows an unscrambler for unscrambling and orientating containers including a hopper having straight or slightly curved walls, a plurality of travelling carriages having holding elements with openings for receiving individual containers and passageways for receiving and positioning the containers, the travelling carriages moving along an enclosed path and being interconnected and drawn by a flexible or hinged drive belt, and an adjustable shelf disposed between holders and passageways for supporting the containers until they reach a discharge station where they drop through an opening in the shelf, the holding elements and passageways also being removable to accommodate different shapes and sizes of containers.

It is understandable that in a machine having these characteristics an important parameter is reliable operation on which total production directly depends, because of which some automatic machines are equipped with control and/or safety components designed to immediately detect any irregularity in the state of the containers (imperfect finish, irregular shape, etc.) or in their positioning in the container transfer means within the machine. Malpositioned containers are pushed back into the receiving or loading area by appropriate means such as nozzle means connected to a suitable compressed air source, as described in European Patent EP 85 106953.4. Nozzle means combined with a belt conveyor provided with appendages is described in the above-mentioned U.S. Pat. No. 4,928,808. When the bottles are defective, they should immediately be rejected and removed from the recesses just after having passed over the discharging zone as in the above-mentioned U.S. Pat. No. 4,681,209 by sensor means and blower means that effects the removal of defective containers to a gathering cavity situated adjacent to the side wall of the hopper, in such a way that they do not at any time interrupt the functioning of the machine.

These machines are not entirely suitable and effective for continuously feeding containers such as bottles at a high speed rate because of the exigencies under these circumstances for an intensive pressurized air jet, as well as for ejecting malpositioned or defective bottles from the transporting recesses, or for assisting the tilting of the container toward the falling chutes. Due to the inertia of the containers produced by high speed operation, zones arise where bottles adhere to the recesses and side wall of the hopper which can not be prevented only by common pressurized air devices. Thus expensive, sophisticated and particularly noisy equipment has been used.

BRIEF SUMMARY OF THE INVENTION

In order to solve the above problems this invention was conceived with the aim to essentially obtain an increase of the machine work yield in a single unit and with a single exit conveyor.

It is an object of this invention to improve upon prior container or bottle unscrambling and positioning machines of the type referred to above by overcoming the above mentioned disadvantages.

It is a further object of this invention to provide a machine for automatically positioning and feeding containers, such as bottles, of many shapes and sizes and which is capable of operating at high speed and handling a high number and volume of containers and continuously supplying them to a bottle filling line or similar associated equipment, with less complexity and less air power consumption and where malpositioned and/or defective containers are always rejected from the area of the recesses thereby allowing continuous functioning of the machine without interruptions.

The above objectives are achieved in accordance with the present invention by the augmentation of the effective length of the container loading area and an amelioration of container positioning in the loading area; prior machines have a small loading area essentially limited to an accumulation zone confined to the lower part of the hopper because of the inclination of the hopper bottom. The increase of the loading area obtained by the machine in U.S. Pat. No. 4,928,808 entails a considerable length of the machine involving particular exigencies of installation.

In addition to this and as an essential feature of the invention, means are provided to assist in the ejection of containers incorrectly positioned in the receiving recesses before reaching the unloading area with a new functional principle and without nozzle means, or at least reducing the power supply of pressurized air where nozzles are used taking advantage of the inertia of the bottles.

The machine according to the instant invention comprises a hopper or receptacle for receiving randomly a plurality of containers or bottles to be sorted, having any convenient configuration and a bottom with a peripheral edge portion at a predetermined distance from the side wall of the hopper to provide a space through which the containers can drop. The hopper and particularly the bottom member may be inclined or frustoconical so that the containers loaded therein move by gravity towards the lower section. A lateral aperture is provided in the side wall of the hopper in a curved lateral area preceding the container unloading station the aperture being adapted to remove mainly by means of centrifugal force malpositioned containers housed only partially in and excessively protruding from holding and transporting units, or located external to them and conveyed by other containers, the aperture communicating with a recovering auxiliary hopper, external to the principal or main hopper. A coupled belt type conveyor is associated with the external hopper for recycling containers into the loading area preceding the lateral aperture.

The machine includes in addition, for contributing to the evacuation of containers through the lateral aperture as a supplement to the action of centrifugal force:

a) nozzle means, located in the hopper in front of the lateral aperture above the bottom plane at such a level and with such an orientation so as to provide an air jet impinging on the bottles which are not correctly positioned in the receiving recesses of holding units, so as to either correctly position bottles in the recesses, or to eject them out pushing them toward the external recovering hopper;

b) alternatively at least one brush having a rotation movement, also located near the zone provided with the lateral aperture, whose bristles exert on the malpositioned containers a resulting force directed from inside to outside the hopper to assist in the evacuation of the containers out of the principal hopper;

c) means helping to tilt containers correctly positioned in the receiving recesses in the unloading area into the discharge chutes constituted either by nozzle means or alternatively by at least a brush whose bristles operate on the containers, producing a resulting force directed downwardly toward the chutes;

d) means to eject defective containers, or containers not discharged in the unloading station, towards another lateral aperture in the side wall of the hopper spaced from the unloading station in the direction of movement of the holding units constituted by at least one brush whose bristles exert on the containers a resulting force directed from inside to outside the hopper;

e) at least one of the receiving recesses and corresponding discharge chutes are provided with a series of brushes in a manner to clean the internal side wall of the hopper below its bottom during their displacement.

The above and other objects, advantages and features of the present invention will become more apparent from the following description of certain preferred embodiments thereof.

BRIEF DESCRIPTION OF THE DRAWINGS

The invention will now be described in detail with reference to the accompanying drawings wherein.

DETAILED DESCRIPTION

Figure 2:
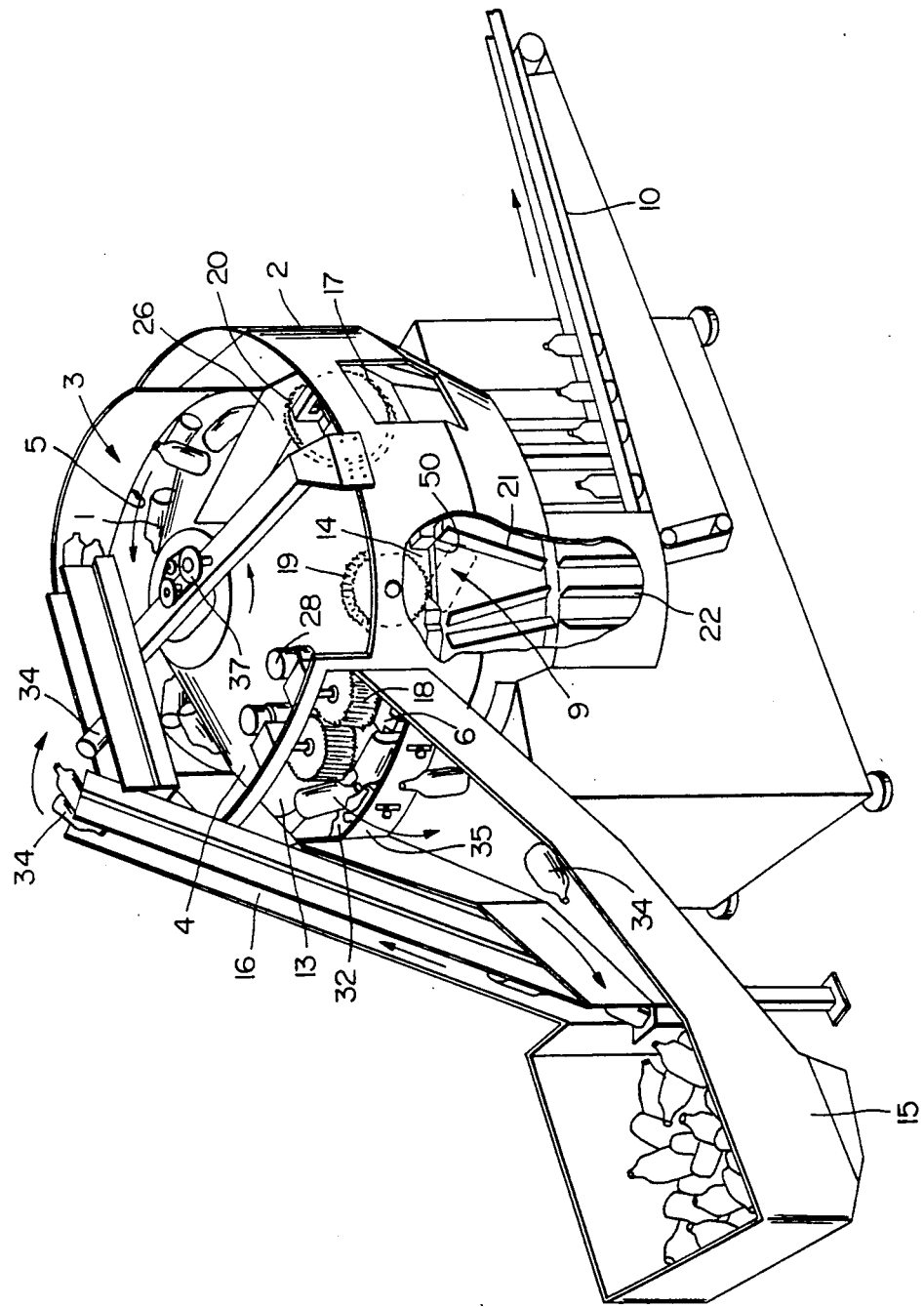
FIG. 2 is a perspective view of a preferred embodiment of the machine of the invention.

With reference to FIG. 2 the machine of this invention includes a hopper 2 provided with an opening formed by shroud member 3 supported on hopper 2 for loading in bulk containers 1 that fall onto a bottom member 4 having edges spaced from the hopper outer wall to provide a space through which the containers can pass.

Figure 3:
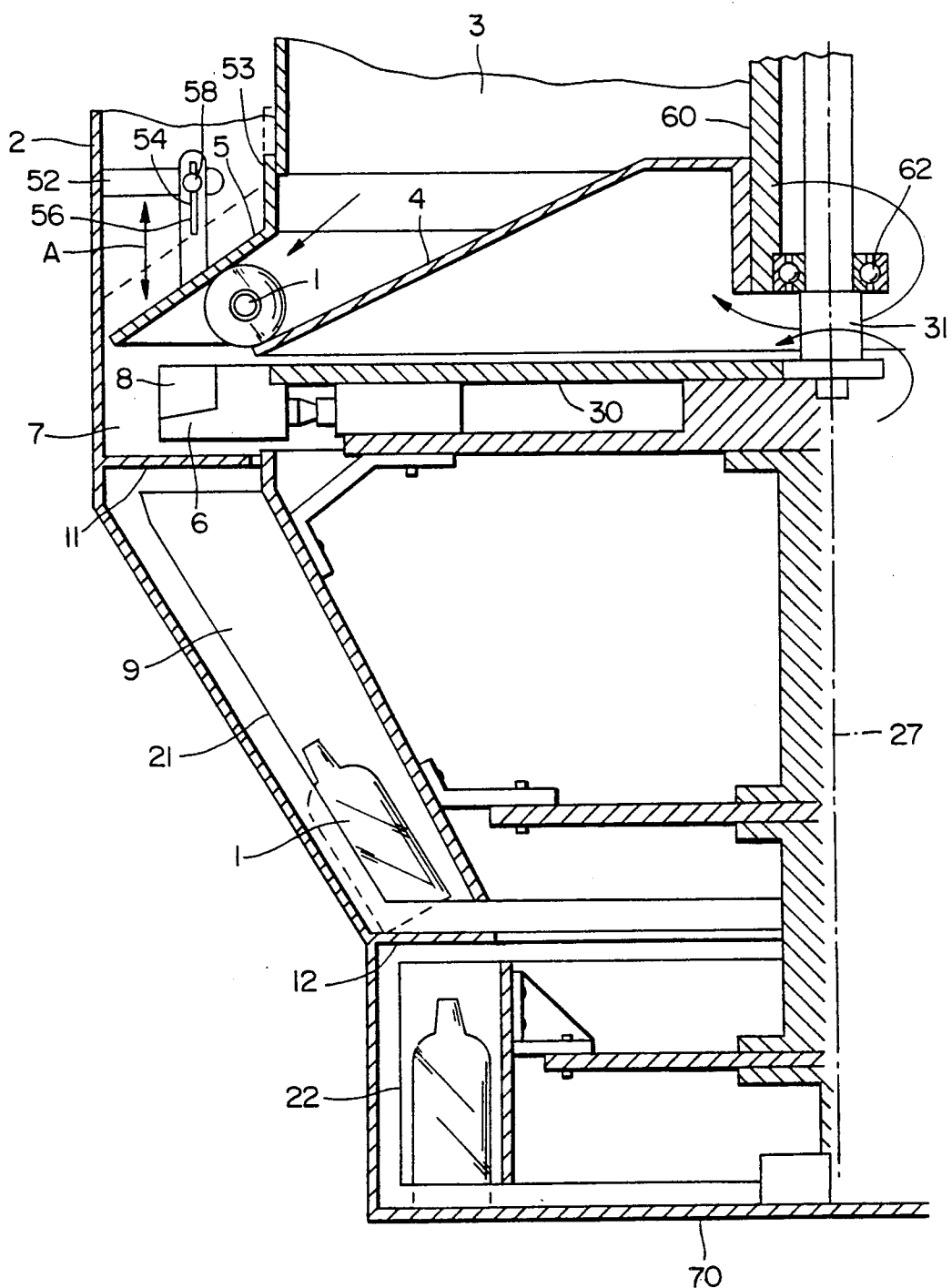
FIG. 3 is a cross-sectional view of part of the machine of FIG. 2.

A structure, provided with displaceable means in an enclosed circuit, located below the bottom 4, includes a rotatable disc assembly 30, similar to that of U.S. Pat. No. 4,681,209 (FIG. 3). Driving means including shaft 31 connected to disc assembly 30 is driven by a motor (not shown) for rotation thereof. A plurality of container holding elements 6 are removably mounted at the periphery of rotatable disc assembly 30 and define between their sides and the edge of the disc and inside of the hopper wall, a series of recesses 7 adapted for receiving the containers in a lying position. Retaining means are provided for one part of the containers, namely the neck, by means of a seat 8 in such a way as to release them in a predetermined position, usually with the neck upward.

A plurality of discharge and guiding chutes 9 are disposed under and aligned with receiving recesses 7 and adapted to receive and transfer the containers, in the desired oriented position, toward an exit conveyor 10 that feed the bottling line.

A fixed plane or annular shelf 11 (FIG. 3), which may be adjustable in height, is located below recesses 7 and over chutes 9 for supporting the containers when they are conveyed by holding elements 6 defining the receiving recesses 7, the shelf including an opening 50 in the unloading area 14 to let pass, one by one, the containers that fall by gravity in the chutes 9.

The bottom of the hopper according to the embodiment shown in FIGS. 2 to 6 is constituted by a frustoconical member 4 mounted on tubular shaft 60 for rotation in the opposite direction from that of disc assembly 30 and holding elements 6 by means of a transmission 37 driven by shaft 31 and connected to tubular shaft 60 mounted on shaft 31 by bearing 62, only one of which is shown in FIG. 3.

Opposing inclined wall 5 is attached to wall part 3 of the hopper in facing spaced relationship to bottom 4. Wall 5 is a frustoconical segment with a greater angle of inclination than bottom 4 so that it is nearer the bottom 4 at the lower part adjacent the bottle receiving recesses 7, and extends (see FIG. 2) in an area about from the area 17 where the defective containers are rejected to the evacuation area 13 of the malpositioned containers, increasing significantly the effective container loading area. Wall 5 may include an adjustable mounting allowing its position, e.g. elevation, to be set relative to bottom 4, such as by an articulation means, for example, comprised of a plurality of adjustable mounting brackets 52 spaced around the inside of hopper 2 and attached thereto by some known means, such as welding, screws, or nuts and bolts, for example (not shown). Upstanding brackets 54 are also attached around inclined wall 5, in positions corresponding to brackets 52, and attached to wall 5 by welding, for example. A slot 56 is provided in each bracket 54 and a set screw 58 extends through slot 56 threadedly engaging in bracket 52 for clamping brackets 54 and wall 5 in the desired position depending upon the size of the containers being handled. A flange 53 extends upwardly from wall 5 having an internal dimension of a size to facilitate sliding engagement with shroud member 3. It will be apparent that with this adjustment device wall 5 can be raised or lowered in the direction of arrow A.

The increase in the loading area is a consequence of the rotational axis 27 of the machine being upright, or only slightly inclined, unlike most of the existing machines referred to above.

Figure 1:
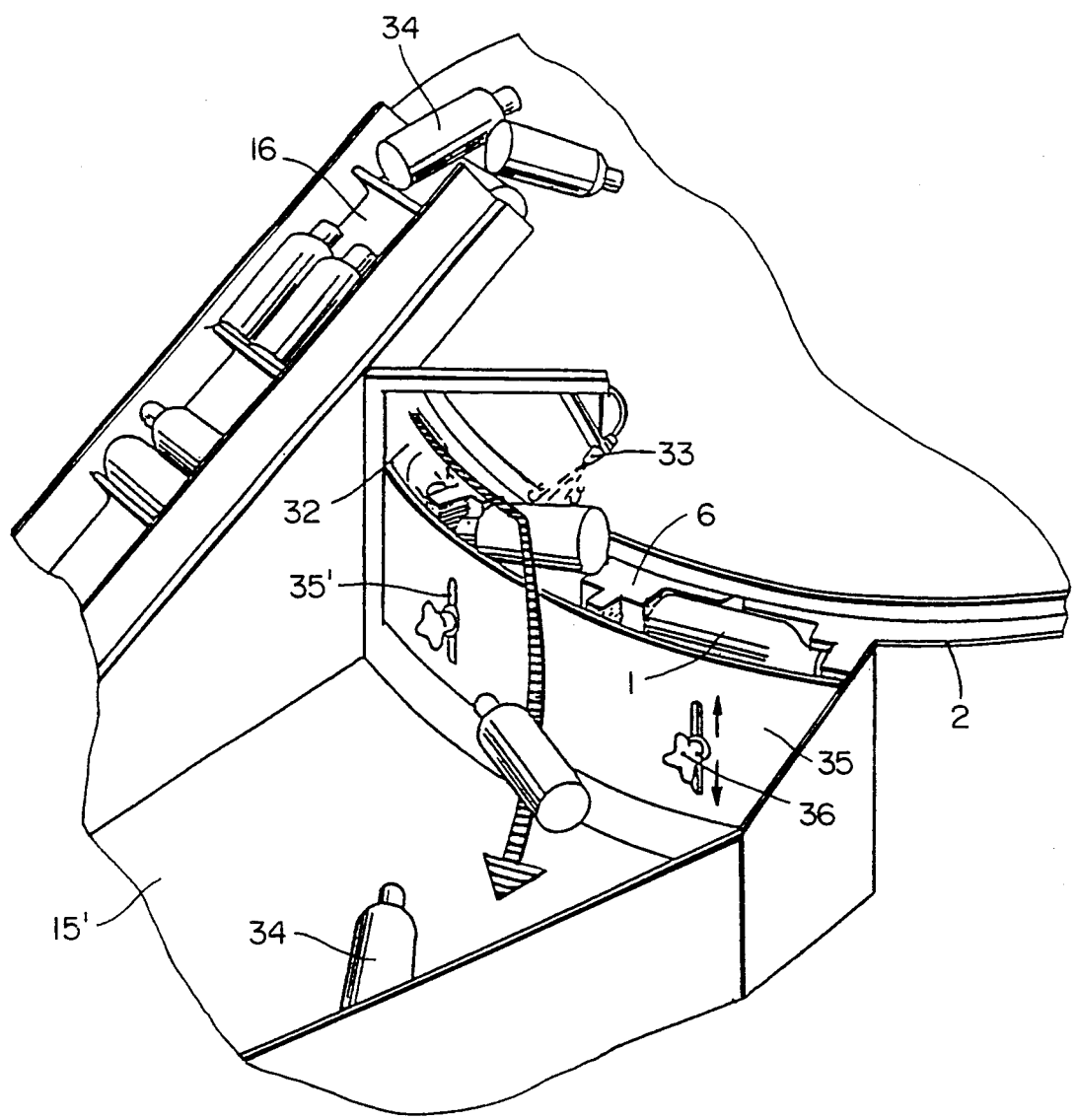
FIG. 1 is a perspective view on an enlarged scale of part of the machine of FIG. 2 showing means employed for evacuating and recycling malpositioned containers.

The means assisting in the evacuation or ejection of the containers incorrectly positioned in the receiving recesses 7 before reaching the unloading area 14 are constituted by a lateral aperture 32 (FIGS. 1 and 2) in the side wall of the hopper 2 in a curved lateral area preceding the container unloading station and by means pushing the malpositioned containers out of the hopper through lateral aperture 32, which may be either nozzle means 33 or at least one brush 18 whose bristles engage the body of the containers and produce a resulting force directed from inside to outside the hopper.

The rejected containers 34 pass down a chute 15' into external hopper 15 coupled to a lifting means or belt type conveyor 16.

The lateral aperture 32 is adjustable in depth by use of a panel 35 superimposed on the machine external wall 2 and adjustable in height by setting means such as clamping screws 36 extending through slots 35' in panel 35 to obturate more or less aperture 32.

The aperture 32 has a length covering a number of recesses 7, a lower side profile substantially parallel to shelf 11 that supports the containers 1, and a vertical width determined by the height of the upper edge of panel 35 with respect to shelf 11, at least equal to a level corresponding to half the diameter, or maximum width, of containers 1, when seated in lying position in recesses 7. This is sufficient to retain containers that are correctly positioned in recesses 7, but will allow incorrectly positioned containers to be ejected.

Figure 6:
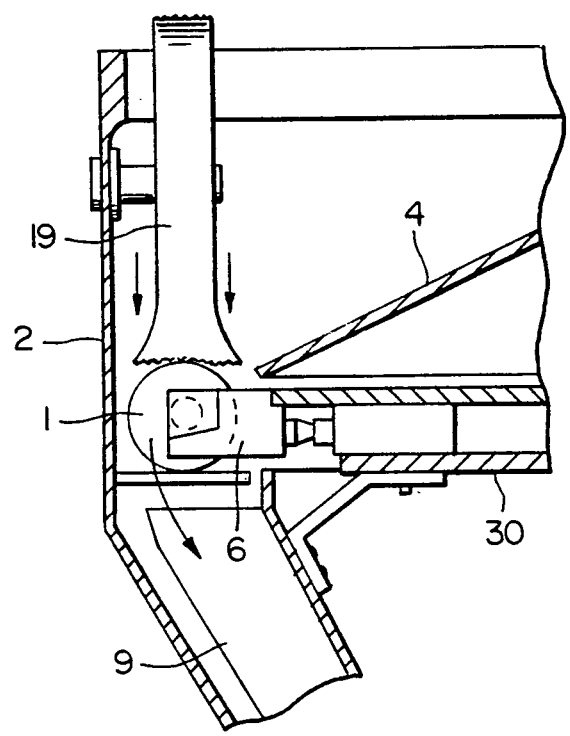

The means designed to help tilt containers correctly positioned in receiving recesses 7 towards chutes 9 are constituted by at least one brush 19 (see FIGS. 2 and 6)

and means to drive it whose bristles engage the bodies of the containers and exert a resulting force thereon directed downwardly.

Figure 5:
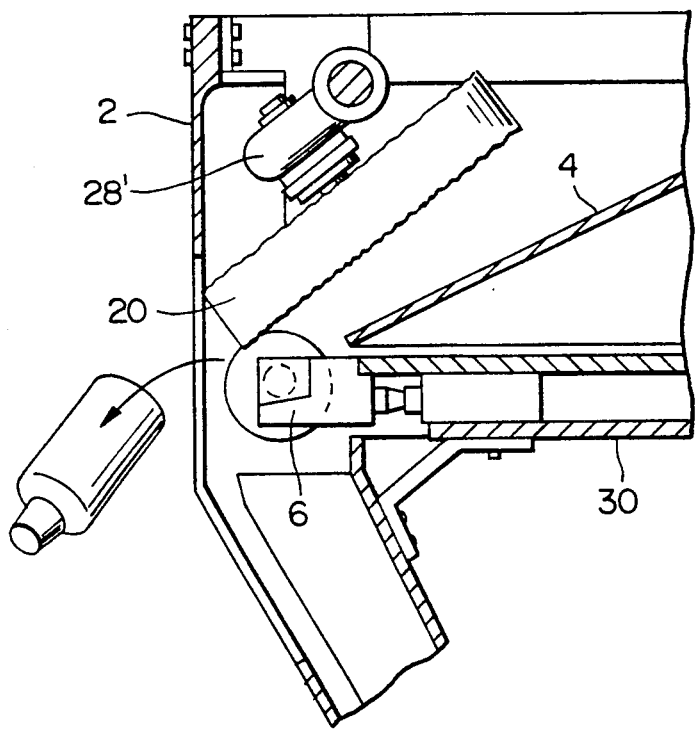
FIGS. 5 and 6 are cross-sectional views of part of the machine of FIG. 2 showing container evacuation and tilting brushes.

The means provided to eject from the hopper defective containers which do not drop at the unloading area 14, are constituted by at least one brush 20 and driving means 28' to rotate it, whose bristles exert on the containers a resulting force directed from inside to outside of the hopper (see FIG. 5).

A motorized device 28 can be provided to drive separately, or by a feedback transmission device, the brushes 18, 19 and 20 in which case, driving means 28' would not be needed.

The falling chutes are constructed in two parts, an upper part 21 inclined toward the machine axis and a lower part 22 substantially upright. An intermediate fixed planar member or annular shelf 12 preventing the containers 1 from falling directly onto the conveyor 10 may be disposed between the two parts 21 and 22 and has an opening (not shown) through which the containers drop onto bottom 70 at a predetermined location as desired to be transferred to exit conveyor 10.

Figure 7:
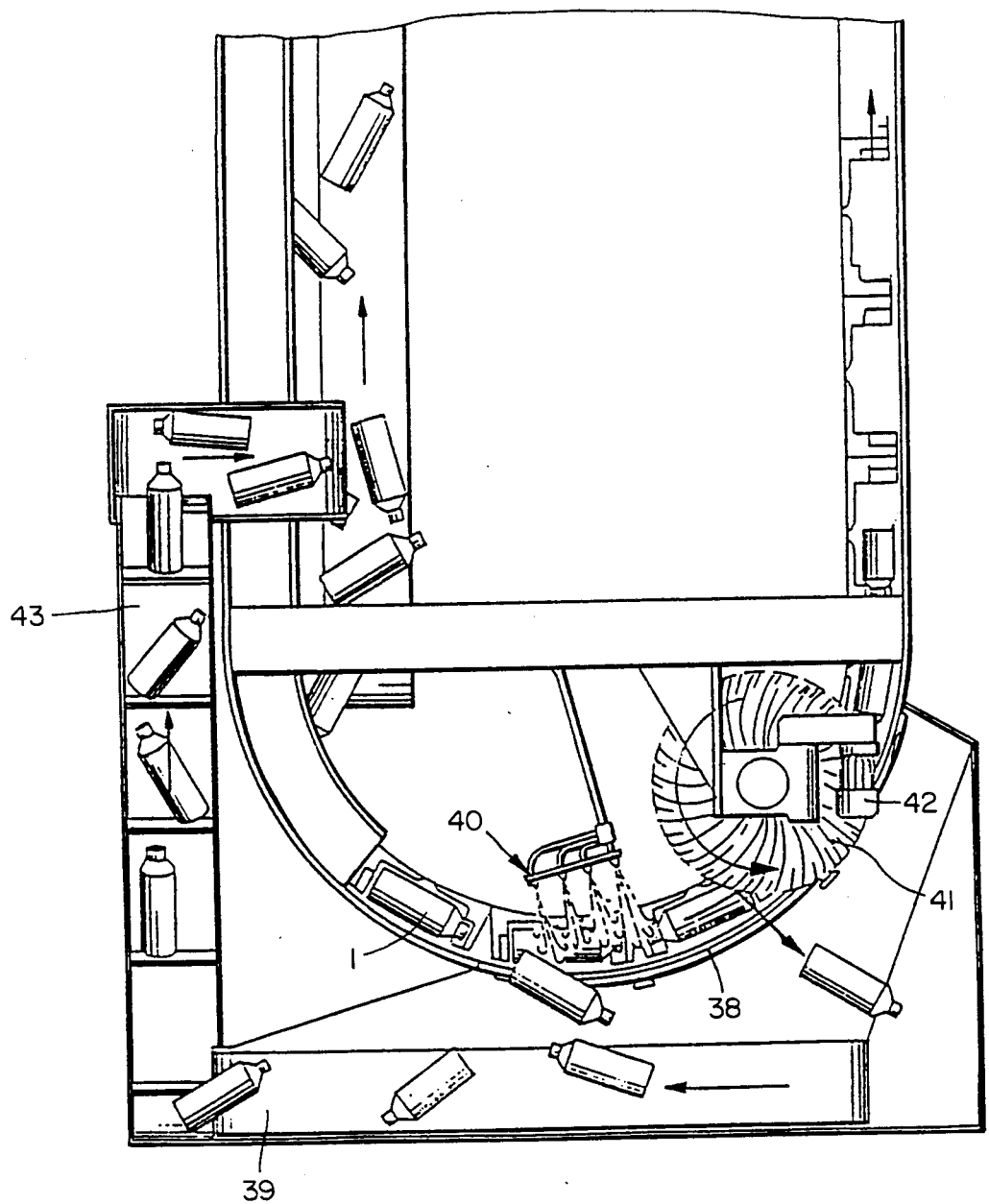
FIG. 7 is a top plan view of part of an alternative embodiment of the invention adapted for use in a machine having a general construction similar to that of U.S. Pat. No. 4,928,808.
Figure 8:
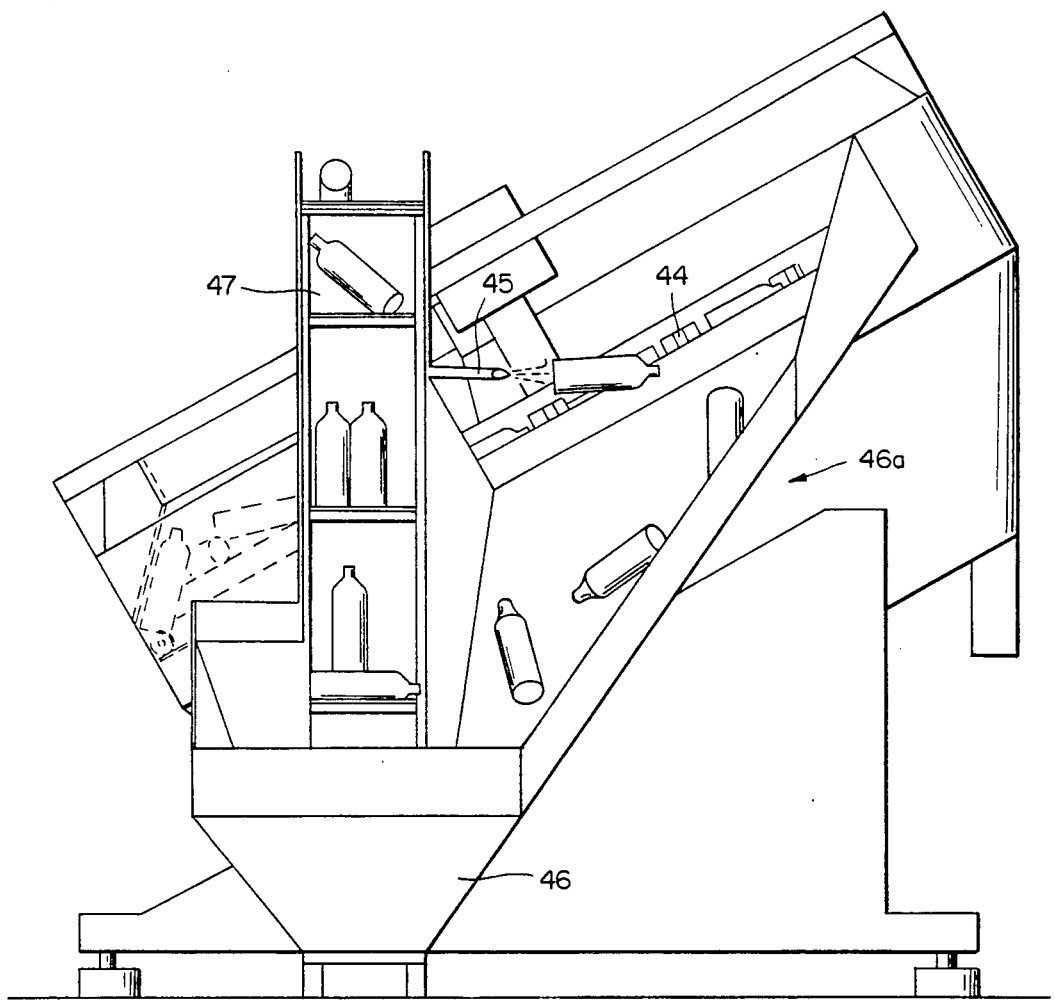
FIG. 8 is a side elevational view of another alternative embodiment of the invention adapted to use in a machine having general construction similar to that of U.S. Pat. No. 4,681,209.

The structure of chutes 9 enables an easy interchangeablity of the passageway elements and may be the same as that shown in my U.S. Pat. No. 4,681,209, particularly as shown in FIGS. 8 and 9 thereof, and the corresponding description. The design and construction of elements 6 may also be the same as shown in FIGS. 5, 6 and 7 of the same patent. For these reasons, my U.S. Pat. No. 4,681,209 is incorporated herein by reference.

One of the recesses (see FIG. 4) and corresponding chute 9 may be provided with a series of brushes 23, 24 and 25 in such a way so as to clean internal surfaces of the machine below the hopper during displacement of these brushes.

Figure 4:
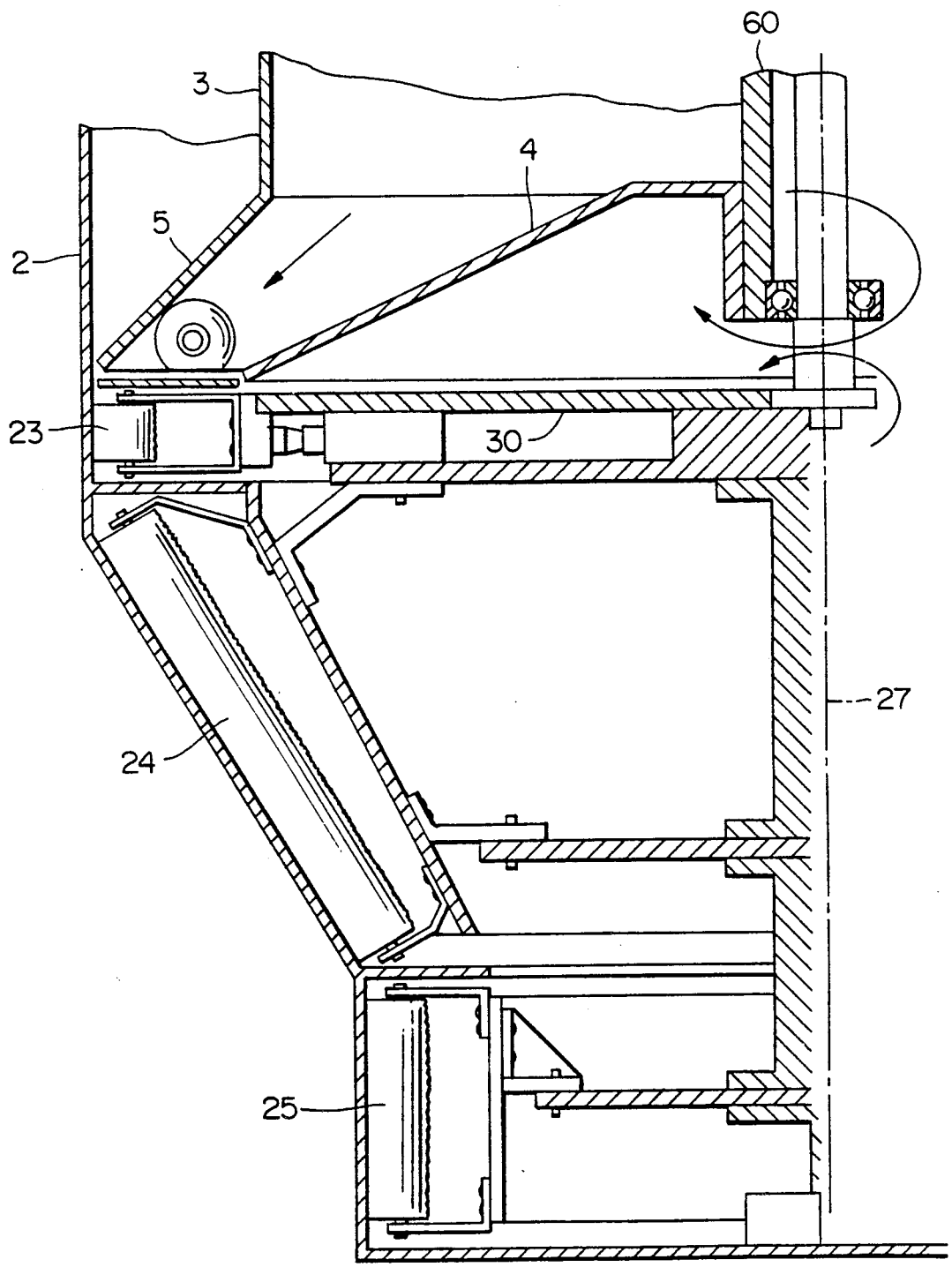
FIG. 4 is a view similar to that of FIG. 3, showing cleaning brushes.

In the embodiment of FIG. 4, wall 5 is shown integral with shroud member 3.

A wall 26 which may extend from and be mounted on side wall 2 limits the loading area in the hopper.

The ejecting brushes described can have horizontal, vertical or inclined axes and can rotate or remain fixed.

The action of the brushes 18 and 20 is added to the action of the centrifugal force acting on the containers and nozzle means 33 can be substituted therefor having less intensity or force than those commonly used to reject malpositioned containers towards the loading area according to the known prior art.

The action of brushes 18 also contributes to stabilizing the positioning of the containers in the receiving recesses 7.

The frustoconical bottom 4 is associated with large wall 26 cooperating therewith to allow the best distribution of the containers in the loading area and because of the orientation of the opposed walls 4 and 5 the containers arrive in a lying position for loading into recesses 7. Thus there is no container accumulation and obstruction by the containers preventing them from reaching the receiving recesses.

It has been found that the operating rate of the machine, due to the improvements of the invention may be virtually doubled.

FIG. 7 corresponds to one machine having a general structure according to my U.S. Pat. No. 4,928,808, incorporated herein by reference, in which a lateral aperture 38 has been produced in the hopper's side wall in a curved zone preceding the container discharging station in order to eject mainly malpositioned containers by centrifugal force through the lateral aperture towards an external auxiliary hopper 39. Nozzle means 40 and a rotating brush 41 having a driving unit 42 are provided to assist in the removal through lateral aperture 38.

A lifting conveyor 43 is provided for recycling the ejected containers towards the charging area of the hopper.

FIG. 8 shows means for ejecting malpositioned containers implemented in a machine like that in my U.S. Pat. No. 4,681,209, incorporated herein by reference, consisting in a lateral aperture 44 in the hopper's side wall at a level of the series of transporting recesses and preceding the discharging area, for ejecting containers by means of centrifugal force and with the help of nozzle means 45, of less intensive power than those commonly used in the prior art, towards an auxiliary external hopper 46 with chute 46' which has coupled thereto a lift conveyor 47 to recycle ejected containers to the charging area of the hopper.

I claim:

1. Machine for automatically orienting containers, such as plastic bottles, comprising:

a main hopper for receiving a plurality of randomly positioned containers;

a side wall on said main hopper;

a bottom in said main hopper having a peripheral portion spaced from said side wall to provide a space through which containers on said bottom can pass;

container holder support means having a peripheral portion and supported below said hopper for movement of said peripheral portion thereof in a path adjacent said peripheral portion of said bottom;

means for driving said container holder support means in said path;

container holder means mounted on said container holder support means for movement therewith and forming recesses for receiving and holding the containers in a lying position from said peripheral portion of said bottom;

discharge openings in said container holder means for allowing the containers to pass therethrough;

container support shelf means extending below said holders for supporting the containers in a lying position in said receiving recesses during movement of said container holder means;

a discharge section in said support shelf means for discontinuing support of the containers at a predetermined location so that containers in said container holder means pass through said openings at said discharge section;

tilting means on said container holder means engaging one part of each container for tilting the container into a predetermined position as the container passes through said openings at said discharge section;

chute means mounted below and movable with said discharge openings for receiving, orientating and guiding containers passing through said discharge openings into a predetermined position, each chute means having a lower exit portion;

a lateral aperture in said side wall container holder means in a curved area preceding said discharge section and adapted for ejection therethrough by centrifugal force containers incorrectly positioned on said container holder means;

an external recovering hopper in communication with said lateral aperture for receiving containers ejected through said lateral aperture; and conveyor means on said external recovering hopper for recycling containers therein by transferring containers from said recovering hopper into the loading area of said main hopper.

2. Machine, as claimed in claim 1 wherein:

said lateral aperture in said side wall of said main hopper has a length substantially equal to at least two recesses and a lower edge lying substantially in a plane extending at a level above said container support shelf a predetermined distance sufficient to retain correctly positioned containers in said recesses.

3. Machine as claimed in claim 2 and further comprising:

a panel having an upper edge adjustably mounted on said side wall and attached to said side wall by releasable locking means facilitating adjustment of the height of said upper edge, said upper edge forming said lower edge of said lateral aperture.

4. Machine as claimed in claim 1, and further comprising:

auxiliary ejector means mounted adjacent to said lateral aperture for applying a force to containers incorrectly positioned on said holder means to eject them out through said lateral aperture into said external hopper.

5. Machine as claimed in claim 4 wherein:

said auxiliary ejector means comprises nozzle means for directing pressurized air onto said incorrectly positioned containers to eject them through said lateral aperture into said external hopper.

6. Machine as claimed in claim 4 wherein:

said auxiliary ejector means comprises at least one brush means having bristles engaging incorrectly positioned containers for exerting a force thereon directed from inside said main hopper through said lateral opening.

7. Machine as claimed in claim 1, wherein:

said hopper bottom has a frustoconical shape;

means are provided for rotating said bottom in a direction opposite to the direction of movement of said holding elements:

an inclined wall member is provided on said side wall extending in spaced relation to said hopper bottom from an area adjacent to the loading area to a zone near said lateral aperture; and said inclined wall member and hopper bottom form a container guiding space leading to said container receiving recesses;

said inclined wall member being adjustably mounted for adjusting the slope thereof to accommodate different shapes and sizes of the containers being handled.

8. Machine as claimed in claim 1 and further comprising:

means for applying a force on correctly positioned containers at said discharge opening comprising at least one brush means having bristles exerting a downward force on said containers for tilting said containers into said chutes.

9. Machine as claimed in claim 1, and further comprising:

a second lateral opening in said side wall spaced from said discharge opening in the direction of movement of said holding elements to facilitate ejection of containers therethrough; and at least one brush means adjacent said second lateral opening having bristles engaging containers remaining on said holding elements for exerting a force on said containers directed toward said second lateral opening for ejecting said containers therethrough.

10. Machine as claimed in claim 6 and further comprising:

motor means operatively connected to said brush means for driving said brush means.

11. Machine as claimed in claim 8 and further comprising:

motor means operatively connected to said brush means for driving said brush means.

12. Machine as claimed in claim 9 and further comprising:

motor means operatively connected to said brush means for driving said brush means.

13. Machine as claimed in claim 1 wherein:

said chute means comprise an upper part inclined toward the machine axis and a lower upright part; and an intermediate fixed planar member is located between said upper and lower parts for preventing containers from falling directly from one upper part to a lower part.

14. Machine as claimed in claim 1 and further comprising:

a plurality of brushes installed in at least one recess and corresponding chute means for engaging and cleaning the hopper internal side wall during movement of said container holder support means.

15. Machine as claimed in claim 1 wherein:

said container holder support means and hopper bottom rotate about an upright axis.

16. Machine as claimed in claim 1 wherein:

said container holder support means and hopper bottom rotate about an inclined axis.

17. Machine as claimed in claim 6, wherein:

said hopper bottom has a frustoconical shape;

means are provided for rotating said bottom in a direction opposite to the direction of movement of said holding elements:

member is provided on said side wall an inclined wall extending in spaced relation to said hopper bottom from the loading area to a zone near said lateral aperture; and said inclined wall member and hopper bottom form a container guiding space leading to said container receiving recesses;

said inclined wall member being adjustably mounted for adjusting the slope thereof to accommodate different shapes and sizes of the containers being handled.

18. Machine as claimed in claim 17 and further comprising:

means for applying a force on correctly positioned containers at said discharge opening comprising at least one brush means having bristles exerting a downward force on said containers for tilting said containers into said chutes.

19. Machine as claimed in claim 18, and further comprising:

a second lateral opening in said side wall spaced from said discharge opening in the direction of movement of said holding elements to facilitate ejection of containers therethrough; and at least one brush means adjacent said second lateral opening having bristles engaging containers remaining on said holding elements for exerting a force on said containers directed toward said second lateral opening for ejecting said containers therethrough.

20. Machine as claimed in claim 19 wherein:

said chute means comprise an upper part inclined toward the machine axis and a lower upright part; and an intermediate fixed planar member is located between said upper and lower parts for preventing containers from falling directly from one upper part to a lower part.

* * * * *